A. J. CLARK.
HOSE COUPLING.
APPLICATION FILED OCT. 29, 1918.
1,296,481.
Patented Mar. 4, 1919.
2 SHEETS—SHEET 2.
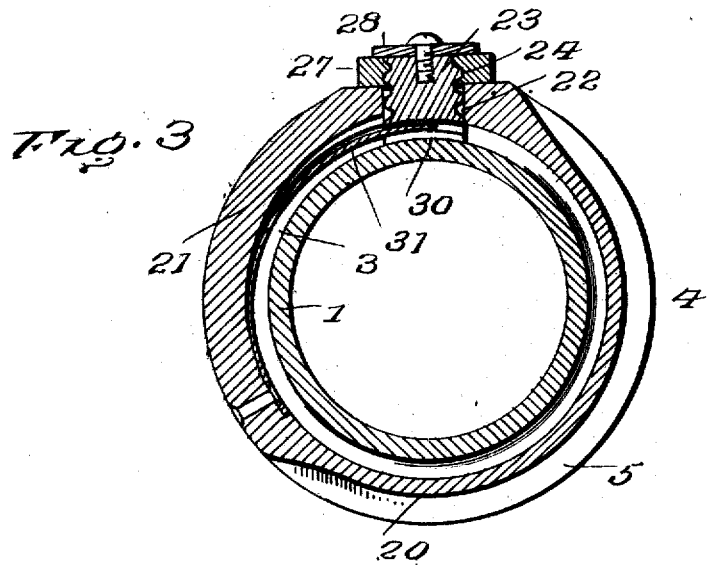
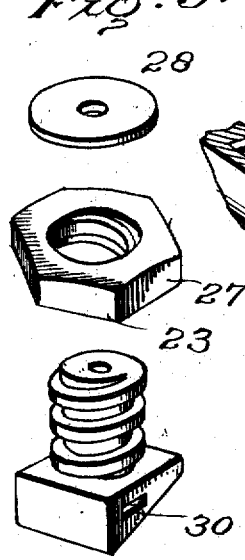
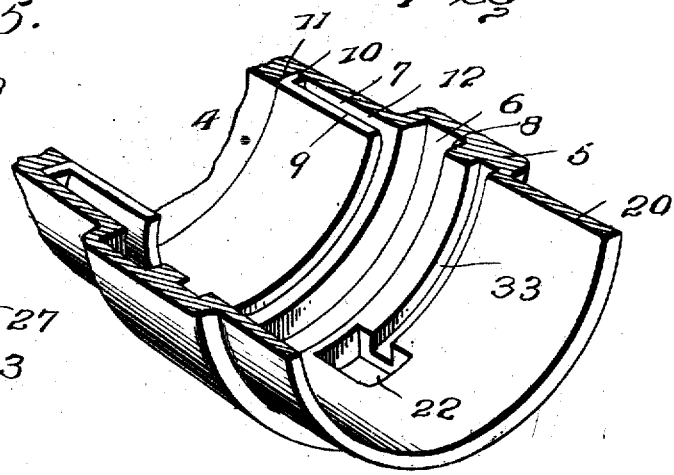
WITNESS:
INVENTOR.
A. J. Clark
BY
ATTORNEY.

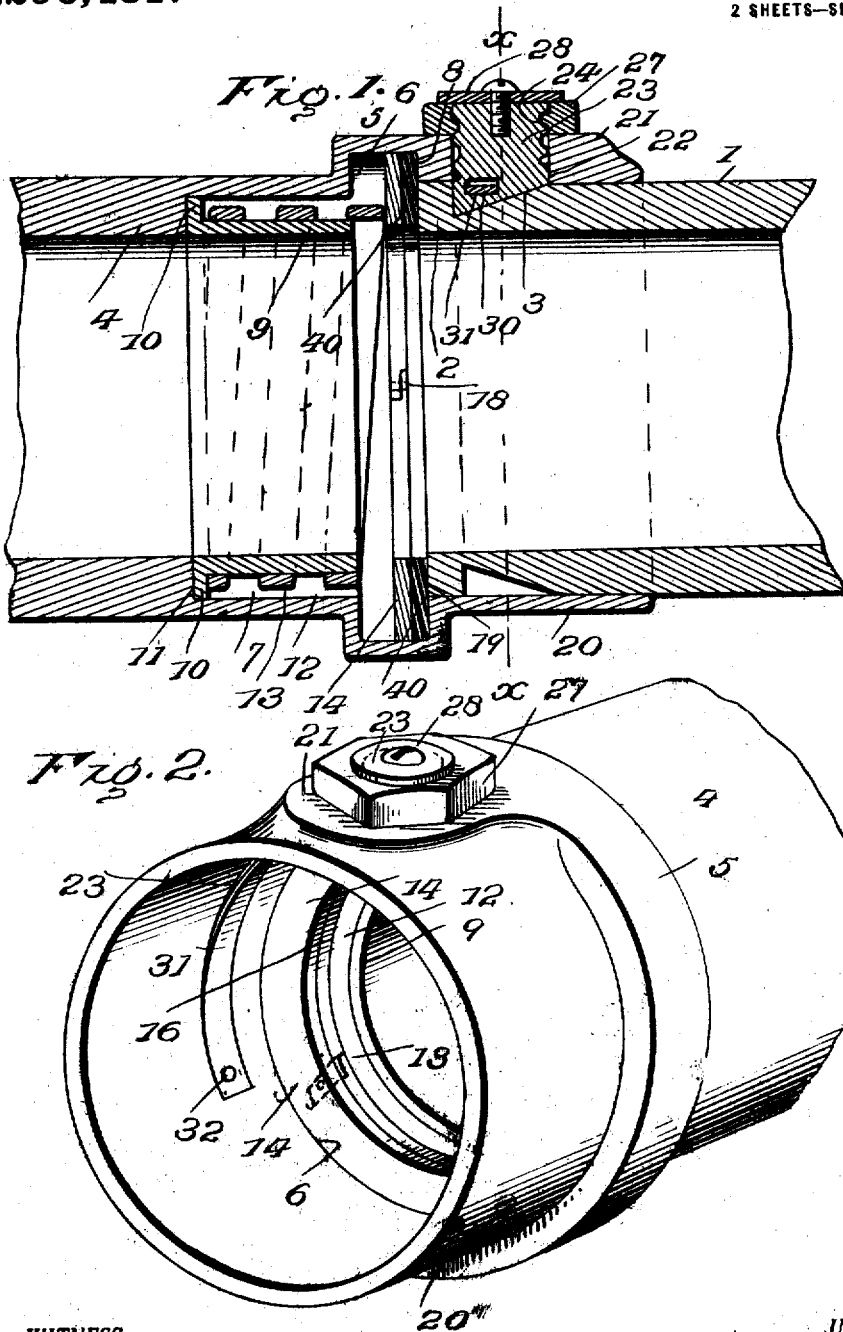

UNITED STATES PATENT OFFICE.

ARTHUR JAMES CLARK, OF TRAVERSE CITY, MICHIGAN.

HOSE-COUPLING.

1,296,481.   Specification of Letters Patent.   Patented Mar. 4, 1919.

Application filed October 29, 1918. Serial No. 260,163.

*To all whom it may concern:*

Be it known that I, ARTHUR JAMES CLARK, a citizen of the United States, residing at 707 St. Division street, Traverse City, in the county of Grand Traverse and State of Michigan, have invented certain new and useful Improvements in Hose-Couplings, of which the following is a specification.

This invention relates to improvements in hose couplings.

The primary object of the invention is to provide a coupling adapted to be quickly and effectively operated, and one which will insure of a water tight joint between the parts.

A further object of the invention is to provide in a two part coupling, means for attaching and detaching the members, and means carried by one member for automatically sealing the joint when the two members are brought together.

The invention also comprehends improvements in the details of construction and arrangement of parts which will be hereinafter described and particularly pointed out in the claims.

In the drawings:—

Figure 1 is a central longitudinal section of the coupling, when in use.

Fig. 2 is a detail perspective view of one of the members.

Fig. 3 is a transverse section on the line *x—x* of Fig. 1.

Fig. 4 is a detail perspective section of one of the members.

Fig. 5 is a detail perspective view of the lock.

1 indicates the hydrant end member of the coupling, and at its outer end it is provided with an annular flange 2, formed by an annular inclined cutaway portion, indicated at 3. The inclined or beveled surface of the cut away portions slants toward the outer end of the coupling section 1, as clearly shown in Fig. 1.

4 indicates the hose end member of the coupling, which is substantially of the same diameter as the member 1, and is enlarged as shown at 5. The enlargement 5, is internally grooved as at 6, and in rear of the groove the member 4 is formed with an elongated annular groove 7, the wall of which is substantially in alinement with an end flange 8, formed by the groove 5. Permanently fixed in the elongated groove 7, is a collar 9, provided with a flange 10, which abuts against the end wall 11, of the groove 7, the inner diameter of the collar corresponding to the inner diameter of the hose member 4. A recess 12, is formed between the collar 9, and the wall of the groove 7, and mounted therein is a strong expansible coil spring 13, the rear end of which bears against the flange 10, while its forward end extends into the transverse plane of the annular groove 5, and terminates beyond the free end of the collar 9.

A packing gland 14, is seated in the annular groove 5, and comprises a metal or like ring 15, formed in overlapping sections 16, fastened together by screws 18. On the face of the ring 15, is a rubber or like ring 19, which overlaps the joint formed between the members 1 and 4, when the coupling is assembled. The spring 13 acts to normally force the packing gland outwardly toward the rear wall of the groove 5, the width of the gland being less than the width of groove 5, permits of the gland having a movement to permit the spring and the gland to perform the desired function.

The hose member 4, is provided with an extension 20, beyond the enlargement, to snugly fit over the end of the hydrant member 1. This extension 20, is enlarged on one side as shown at 21, and in the same is formed an opening 22, which is in radial alinement with the cut away portion 3 of the hydrant member. A lock 23, operates in the opening 22, and its inner surface is beveled to engage with the beveled surface of the cut away portion 3 on member 1. The upper portion of the lock 23 is provided with a coarse thread 24, which extends beyond the enlarged portion 21 and which is engaged by a nut 27, which seats on the outer surface of the enlarged portion. A washer 28, is secured to the upper end of the lock, and it overlaps the nut to limit the inward movement of the lock when operating the coupling.

Near the inner end of the lock there is formed a transverse opening 30, through which extends the free end of a leaf spring 31, the opposite end of the spring being fastened to the extension 20 of the hose member, as indicated at 32. The spring 31, is confined in a groove 33, formed on the inside of the extension, so that when the lock is withdrawn the spring will not interfere with the flange 2 of member 1, when assembling the coupling. The tension of the spring is such as to tend to draw the lock inwardly toward the center of the member 1, to actuate the lock when the nut is rotated.

To operate the coupling, the extension 20 on hose member 4 is slipped over the end of the hydrant member 1, until the packing gland 14 engages the flange 2 and places spring 13 under increased tension. In this movement the beveled end of the lock engages the flange 2, and forces the lock into its openings until the cut out portion 3 is reached, whereupon the spring 31, quickly acts to pull the lock into position behind the flange.

When the parts are thus assembled, as shown in Fig. 1, the spring 13 behind the gland 14 forces the latter over the joint 40, between the flange 2, and the adjacent wall of the groove, consequently effecting a seal. The gland engaging the face of the flange 2 forces the latter against the face of the lock, with the result that the two coupling members are locked together, and the joint between said members is effectively sealed.

Any slight wear between the parts will be readily taken care of by the resiliency of the rubber ring, although it is primarily intended that the parts will so fit and coöperate, that when the lock is in its seat the faces of the flange and adjacent wall of the groove will be flush, and that the overlapping rubber ring will squarely engage same.

To uncouple the members, the nut 27 is rotated, which action withdraws the lock 23 against the tension of the spring 31, and out of the annular cut away portion, and frees the flange 2, whereupon the hose member 4, can very readily be withdrawn from the hose member 1.

From the foregoing description it is evident I have provided a simple and effective coupling, and one which can be quickly and conveniently operated to couple and uncouple hose sections.

What I claim is:—

1. A hose coupling comprising two members, one of which is provided with an expansible spring and a packing gland with which the spring engages, the other member having an annular flange with which the packing gland engages, a threaded lock mounted on the first mentioned member and engaging behind the flange to lock the two members together, a nut engaging the threaded portion of the lock to actuate the same, and a spring for normally drawing the lock inwardly to locking position.

2. A hose coupling comprising a member formed with an annular groove and an extension, an expansible spring located in said member and extended into the groove, a packing gland in the groove, the extension having an opening, a lock mounted in the opening, a spring mounted in the extension and engaging the inner end of the lock to normally draw the lock inwardly to operative position, means on the outside of the extension to actuate the lock to move same in and out, and a second member formed with an end flange and adapted to fit in the extension, the flange engaging the packing gland and the lock when operated to draw same inwardly engaging back of the flange, whereby to lock the members together.

3. A hose coupling comprising a member formed with a groove and an extension, a collar supported in said member, and spaced from the wall of the latter to form a recess, an expansible spring mounted in the recess and extended into the annular groove, a packing gland in the annular groove, the spring engaging the gland, the extension having an opening, a lock mounted in the opening, a spring on the inside of the extension to normally draw the lock inwardly, the lock having a threaded portion, a nut on the outside of the extension to engage the threaded portion to move the lock out, and a second member having an end flange which engages the packing gland, and which is engaged by the inner end of the lock, whereby to hold the two members together.

4. A hose coupling comprising two members, one fitting within the other, a spring actuated packing gland between the two members, one of said members having a flange, a lock on the other of said members to engage the flange, said lock having a threaded stem, a nut engaging the threaded stem, and a spring which acts to draw the lock inwardly to locking position.

5. A hose coupling comprising a member provided with an enlargement formed with an inner groove and further provided with an extension, a flanged collar supported inside said member and spaced from the inner wall thereof to provide a recess, a packing gland in the annular groove, an expansible spring in the recess, one end of said spring engaging the flange of the collar, and the other end engaging the packing gland, a second member fitting in the extension and engaging the packing gland, a lock between the two members comprising threaded means to move said lock out, and a spring which normally draws said lock into locking position, whereby the two members may be coupled or uncoupled.

In testimony whereof I affix my signature.

ARTHUR JAMES CLARK.